(12) United States Patent
Cheng

(10) Patent No.: US 9,019,603 B2
(45) Date of Patent: Apr. 28, 2015

(54) TWO-PARALLEL-CHANNEL REFLECTOR WITH FOCAL LENGTH AND DISPARITY CONTROL

(75) Inventor: Fuhua Cheng, Lexington, KY (US)

(73) Assignee: Amchael Visual Technology Corp., Hsinchu (TW)

( * ) Notice: Subject to any disclaimer, the term of this patent is extended or adjusted under 35 U.S.C. 154(b) by 331 days.

(21) Appl. No.: 13/427,641

(22) Filed: Mar. 22, 2012

(65) Prior Publication Data

US 2013/0250410 A1    Sep. 26, 2013

(51) Int. Cl.
| | | |
|---|---|---|
| G02B 27/22 | (2006.01) | |
| G02B 27/24 | (2006.01) | |
| G02B 27/14 | (2006.01) | |
| H04N 13/02 | (2006.01) | |
| G03B 17/56 | (2006.01) | |
| G03B 35/10 | (2006.01) | |

(52) U.S. Cl.
CPC .......... *G02B 27/143* (2013.01); *H04N 13/0207* (2013.01); *H04N 13/0235* (2013.01); *G03B 17/565* (2013.01); *G03B 35/10* (2013.01)

(58) Field of Classification Search
None
See application file for complete search history.

(56) References Cited

U.S. PATENT DOCUMENTS

| | | | |
|---|---|---|---|
| 2,314,174 A | 3/1943 | Steinman | |
| 3,184,630 A | 5/1965 | Geer | |
| 4,475,126 A | 10/1984 | Akins | |
| 4,568,970 A | 2/1986 | Rockstead | |
| 4,687,310 A | 8/1987 | Cuvillier | |
| 4,751,570 A | 6/1988 | Robinson | |
| 5,349,403 A * | 9/1994 | Lo | 396/324 |
| 5,461,495 A | 10/1995 | Steenblik et al. | |
| 5,532,777 A | 7/1996 | Zanen | |
| 5,546,226 A | 8/1996 | Herington | |
| 5,570,150 A | 10/1996 | Yoneyama et al. | |
| 5,727,242 A | 3/1998 | Lo et al. | |
| 5,757,548 A | 5/1998 | Shimomukai | |
| 5,828,913 A | 10/1998 | Zanen | |
| 5,835,133 A | 11/1998 | Moreton et al. | |
| 5,883,662 A | 3/1999 | Zanen | |
| 5,892,994 A | 4/1999 | Inaba | |
| 6,122,597 A | 9/2000 | Saneyoshi et al. | |
| 6,208,813 B1 | 3/2001 | Carlsson et al. | |
| 6,278,460 B1 | 8/2001 | Myers et al. | |
| 6,643,396 B1 | 11/2003 | Hendriks et al. | |
| 6,668,082 B1 | 12/2003 | Davison et al. | |
| 6,819,488 B2 | 11/2004 | Zanen | |

(Continued)

OTHER PUBLICATIONS

"Rectify," the Free Merriam-Webster Dictionary, "http://merriam-webster.com/dictionary/rectify," Jul. 24, 2014.*

(Continued)

*Primary Examiner* — Jade R Chwasz
(74) *Attorney, Agent, or Firm* — King & Schickli, LLC

(57) ABSTRACT

A two-parallel-channel reflector (TPCR) with focal length and disparity control is provided. The TPCR is connected to an imaging device, so that an image of a scene is captured to generate a stereoscopic image. The TPCR has two parallel channels that allow the imaging device to generate a left side view image and a right side view image of the shot scene synchronously. Each parallel channel includes an outward reflecting unit and an inward reflecting unit, which are designed to ensure that light rays in the parallel channels are reflected in a collimated and parallel manner. During imaging, a position and an angle of the outward reflecting unit can be adjusted to fulfill the function of controlling the disparity and the focal length.

20 Claims, 11 Drawing Sheets

(56) References Cited

U.S. PATENT DOCUMENTS

| | | |
|---|---|---|
| 6,915,073 B2 | 7/2005 | Seo |
| 6,963,661 B1 | 11/2005 | Hattori et al. |
| 6,996,339 B2 | 2/2006 | Miyoshi et al. |
| 7,061,532 B2 | 6/2006 | Silverstein |
| 7,065,242 B2 | 6/2006 | Petrov et al. |
| 7,075,735 B2 | 7/2006 | Nozawa et al. |
| 7,106,365 B1 | 9/2006 | Sogawa |
| 7,132,933 B2 | 11/2006 | Nakai et al. |
| 7,170,677 B1 | 1/2007 | Bendall et al. |
| 7,181,136 B2 | 2/2007 | Perisic |
| 7,263,209 B2 | 8/2007 | Camus et al. |
| 7,274,800 B2 | 9/2007 | Nefian et al. |
| 7,362,881 B2 | 4/2008 | Hattori et al. |
| 7,420,750 B2 | 9/2008 | Kuthirummal et al. |
| 7,606,485 B2 | 10/2009 | Ohashi |
| 7,710,451 B2 | 5/2010 | Gluckman et al. |
| 7,877,706 B2 | 1/2011 | Albertson et al. |
| 7,899,321 B2 | 3/2011 | Cameron et al. |
| 8,085,293 B2 | 12/2011 | Brodsky et al. |
| 8,267,781 B2 | 9/2012 | Geiss |
| 8,325,978 B2 | 12/2012 | Chai et al. |
| 8,351,651 B2 | 1/2013 | Lee |
| 8,396,252 B2 | 3/2013 | El Dokor |
| 8,417,026 B2 | 4/2013 | Wu et al. |
| 8,870,379 B2 * | 10/2014 | Choi .............................. 353/7 |
| 2001/0053287 A1 | 12/2001 | Inaba |
| 2003/0072569 A1 | 4/2003 | Seo |
| 2003/0072570 A1 | 4/2003 | Seo |
| 2003/0133707 A1 | 7/2003 | Perisic |
| 2003/0156187 A1 | 8/2003 | Gluckman et al. |
| 2004/0189720 A1 | 9/2004 | Wilson et al. |
| 2004/0252863 A1 | 12/2004 | Chang et al. |
| 2005/0057806 A1 | 3/2005 | Nozawa et al. |
| 2005/0185050 A1 | 8/2005 | Ohashi |
| 2005/0254817 A1 | 11/2005 | McKee |
| 2006/0077543 A1 | 4/2006 | Miyoshi et al. |
| 2006/0082879 A1 | 4/2006 | Miyoshi et al. |
| 2006/0115119 A1 | 6/2006 | Nagaoka et al. |
| 2006/0204038 A1 | 9/2006 | Yokota et al. |
| 2007/0165306 A1 | 7/2007 | Bendall et al. |
| 2007/0188603 A1 | 8/2007 | Riederer et al. |
| 2008/0031514 A1 | 2/2008 | Kakinami |
| 2009/0168152 A1 | 7/2009 | Gelernt et al. |
| 2010/0289874 A1 | 11/2010 | Cheng |
| 2010/0321477 A1 | 12/2010 | Iwasaki |
| 2012/0057000 A1 | 3/2012 | Rohaly et al. |
| 2012/0320165 A1 | 12/2012 | Schuck |
| 2013/0063336 A1 | 3/2013 | Sugimoto et al. |

OTHER PUBLICATIONS

Office Action for U.S. Appl. No. 13/301,293 dated Feb. 13, 2014.
Final Office Action issued in U.S. Appl. No. 12/885,810 dated Jul. 8, 2013.
Final Office Action issued in U.S. Appl. No. 13/301,293 dated May 30, 2014.
International Search Report and Written Opinion for International Application No. PCT/US2011/040247 dated Oct. 7, 2011.
Non-Final Office Action issued in U.S. Appl. No. 12/885,810 dated Jan. 16, 2014.
Non-Final Office Action issued in U.S. Appl. No. 12/885,810 dated Jul. 3, 2014.
Non-Final Office Action issued in U.S. Appl. No. 12/885,810 dated Nov. 15, 2012.

* cited by examiner

TWO-PARALLEL-CHANNEL REFLECTOR WITH FOCAL LENGTH AND DISPARITY CONTROL

BACKGROUND OF THE INVENTION

1. Field of the Invention

The present invention relates to a two-parallel-channel reflector (TPCR) with focal length and disparity control, and in particular, to a TPCR with focal length and disparity control, having two parallel channels that allow an imaging device to capture a left side view image and a right side view image of a shot scene synchronously and capable of adjusting a position and an angle of an outward reflecting unit according to imaging requirements during imaging to control the disparity and the focal length.

2. Related Art

Conventional computer stereo vision uses two or more imaging devices such as two or more cameras to shoot images of the same scene from different view angles. The imaging devices are separated by a suitable distance, like human eyes. When a person views an object, a disparity effect is generated because of a distance between the eyes, thus the image has a stereoscopic impression. Accordingly, after each imaging device respectively performs imaging through analysis and calculation of computer software, the depth of the scene in the picture may be calculated with the principle similar to the human eye disparity, so as to generate images-plus-depth information. Therefore, with the image obtained by each imaging device and the calculated images-plus-depth information, a digital stereo image may be generated. Currently, the relevant conventional technologies include:

(1) a two-channel multi-view imaging system patented by Andre Redert and Emile Hendriks in 2003, where reference may be made to U.S. Pat. No. 6,643,396 "Acquisition of 3-D Scenes with a Single Hand Held Camera"; and (2) a single hand held camera installed on a reflector patented by Pieter O. Zanen, where reference may be made to U.S. Pat. No. 5,532,777 "Single lens apparatus for three-dimensional imaging having focus-related convergence compensation".

Referring to FIG. 1, in a two-channel multi-view imaging system 1, a hand held camera 11 is installed on a reflector 12 patented by Pieter O. Zanen. The reflector 12 has two imaging channels (a left imaging channel 121 and a right imaging channel 122), and each channel is bounded by two flat reflecting mirrors. As shown in FIG. 1, the left imaging channel 121 is bounded by a first center mirror 1211 and a left mirror 1212, and the right imaging channel 122 is bounded by a second center mirror 1221 and a right mirror 1222. Light rays L1 (or captured images) entering the left imaging channel 121 arrive at the left mirror 1212, are reflected to the first center mirror 1211, and are then reflected to the camera 11. Light rays L2 entering the right imaging channel 122 arrive at the right mirror 1222, are reflected to the second center mirror 1221, and are then reflected to the camera 11. Hence, an image generated by Redert/Hendriks' imaging system 1 at least contains two views of the scene, that is, a left view and a right view. That is, the imaging system 1 can obtain images of different view angles synchronously by using only one camera. However, the two imaging channels of the imaging system 1 are constructed by flat reflecting mirrors, in which the problem that miniaturization cannot be achieved exists. FIG. 2 is a schematic diagram of optical paths of the conventional imaging system. Referring to FIG. 2, the center mirrors (1211, 1221) and the side mirrors (1212, 1222) are all flat, so that, for the purpose of obtaining complete imaging and satisfying a large focal length range during imaging, the sizes of the center mirrors (1211, 1221) and the side mirrors (1212, 1222) should be as large as possible to adapt to the angles of incidence and reflection of the light rays and the images. As a result, the entire dimension of the finished product, for example, the thickness d1, is quite large, which not only occupies a large space, but also causes inconveniences in use. On the contrary, if the sizes of the center mirrors (1211, 1221) and the side mirrors (1212, 1222) are reduced, the focal length during imaging is limited.

An improvement of Redert and Hendriks' approach was patented by Shuzo Seo in 2005, where reference may be made to U.S. Pat. No. 6,915,073 "Stereo Camera and Automatic Convergence Adjusting Device". In the technology disclosed in this patent, a pivot mechanism is added to the two-channel reflector so that outward mirrors can be rotated about the pivot mechanism. This rotation process is automatically performed when lens of the camera are zoomed. As a result, the focal length of the two-channel reflector can be automatically adjusted. This is an important invention on single-lens, multi-view imaging process. However, unfortunately, due to the fact that flat mirrors are used for both outward reflecting and inward reflecting, this technology cannot adjust the disparity of the reflector either.

SUMMARY OF THE INVENTION

In view of the above problems, the present invention is directed to a TPCR with focal length and disparity control that is capable of being miniaturized and adjusting the disparity and focal length in capturing of an image.

In order to achieve the above objectives, the present invention uses two outward reflecting units and two corresponding inward reflecting units to construct two imaging channels, so that light and images are reflected in parallel in reflection paths formed between the outward reflecting units and the inward reflecting units. In this way, the thickness of the imaging channel can be greatly reduced, thereby achieving the requirement of miniaturization. Furthermore, in the present invention, due to the characteristics of the parallel reflection paths, the outward reflecting unit is further manufactured to be capable of adjusting the position and angle, so that a distance between the outward reflecting unit and the inward reflecting unit and the angle of the outward reflecting unit are adjusted, thereby achieving the efficacy of adjusting the focal length and disparity in imaging.

BRIEF DESCRIPTION OF THE DRAWINGS

The present invention will become fully understood from the detailed description given herein below for illustration only, and thus are not limitative of the present invention, and wherein.

DETAILED DESCRIPTION OF THE INVENTION

Figure 1:
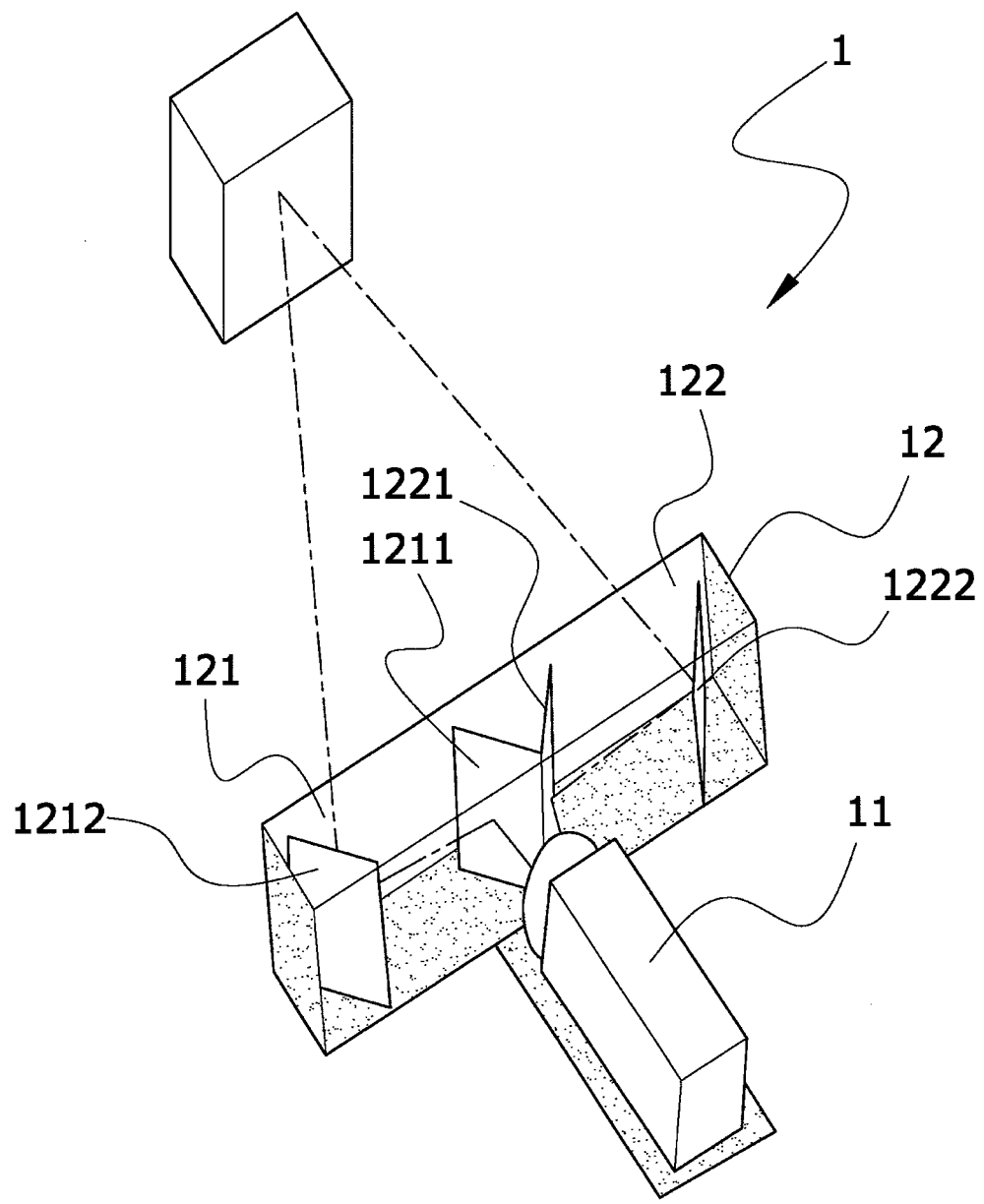
FIG. 1 shows a conventional two-channel multi-view imaging system.
Figure 2:
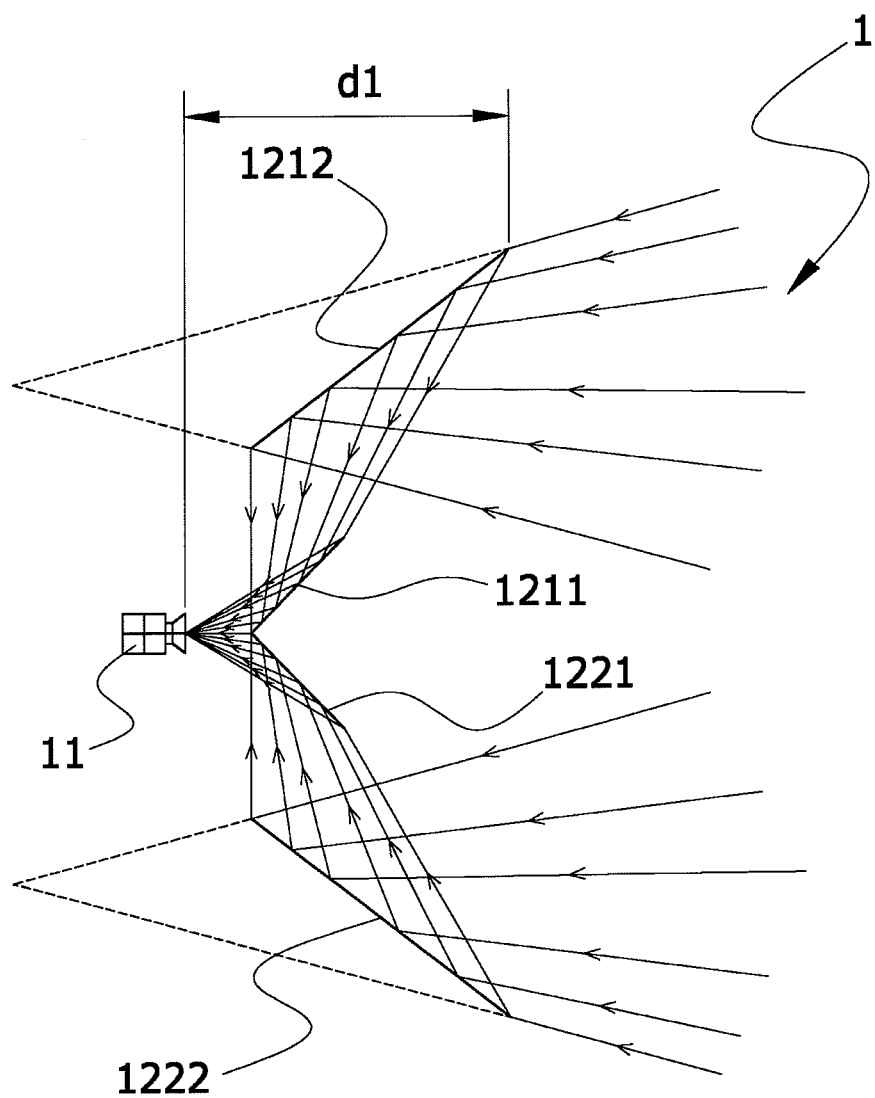
FIG. 2 is a schematic diagram of optical paths of the conventional imaging system.
Figure 3:
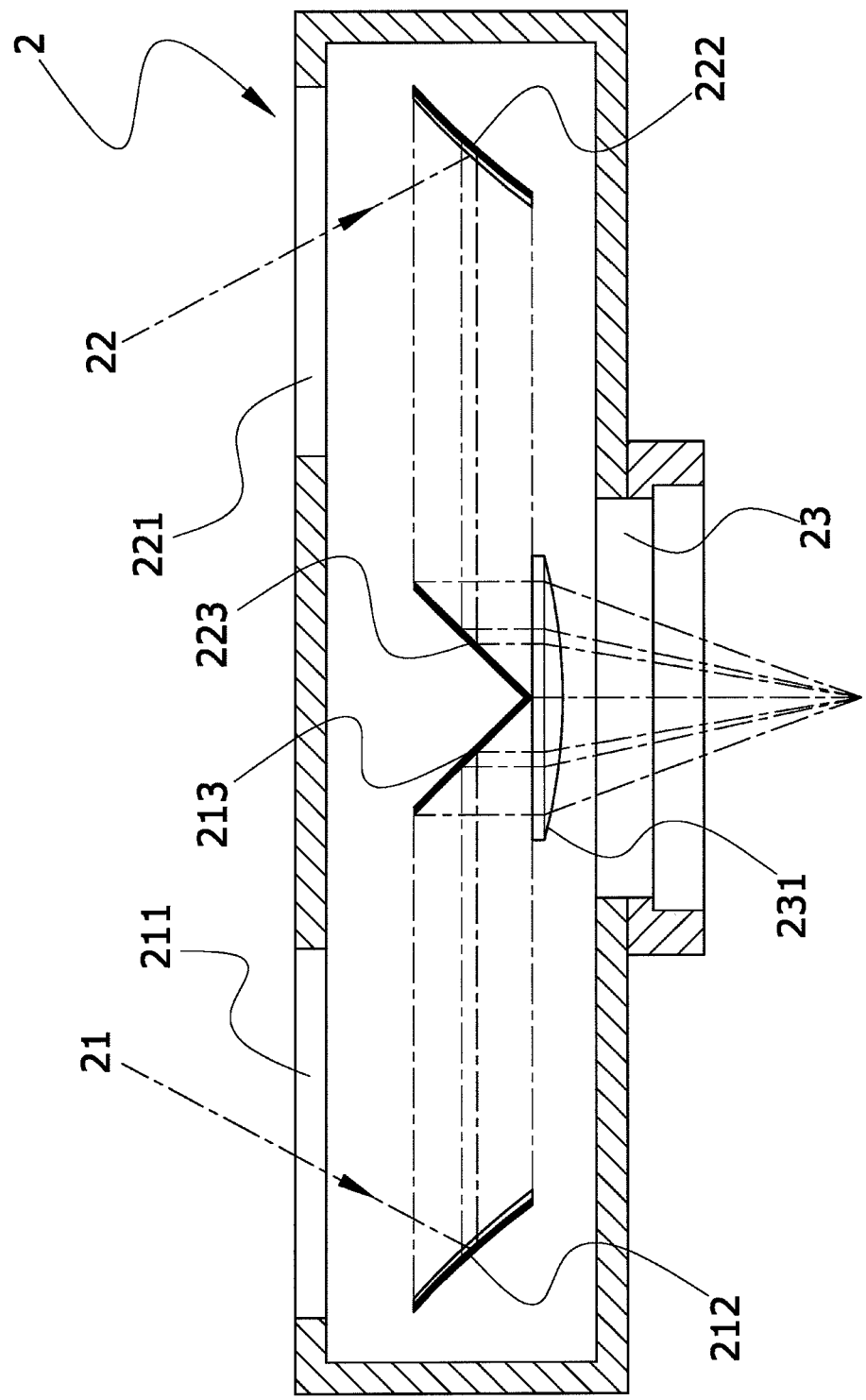
FIG. 3 is a schematic constitutional diagram of the present invention.

FIG. 3 is a schematic constitutional diagram of the present invention. As shown in FIG. 3, a TPCR with focal length and disparity control 2 is mainly constructed by a left side imaging channel 21, a right side imaging channel 22, and a central image inlet 23. An end of the left side imaging channel 21 and an end of the right side imaging channel 22 are connected to the central image inlet 23. The left side imaging channel 21 is constructed by a left side image inlet 211, a left side outward reflecting unit 212, and a left side inward reflecting unit 213. The right side imaging channel 22 is constructed by a right side image inlet 221, a right side outward reflecting unit 222, and a right side inward reflecting unit 223. A convex lens 231 is assembled in the central image inlet 23. As shown in FIG. 3, the left side outward reflecting unit 212 and the right side outward reflecting unit 222 are curved reflecting mirrors, and are used for reflecting light and an image that enter the left side imaging channel 21 and the right side imaging channel 22 in parallel to the left side inward reflecting unit 213 and the right side inward reflecting unit 223. As shown in FIG. 3, after being reflected in parallel to the left side inward reflecting unit 213 and the right side inward reflecting unit 223, the light and the image are reflected again and are focused through the convex lens 231, and then pass through the central image inlet 23 and enter an imaging device.

Figure 4:
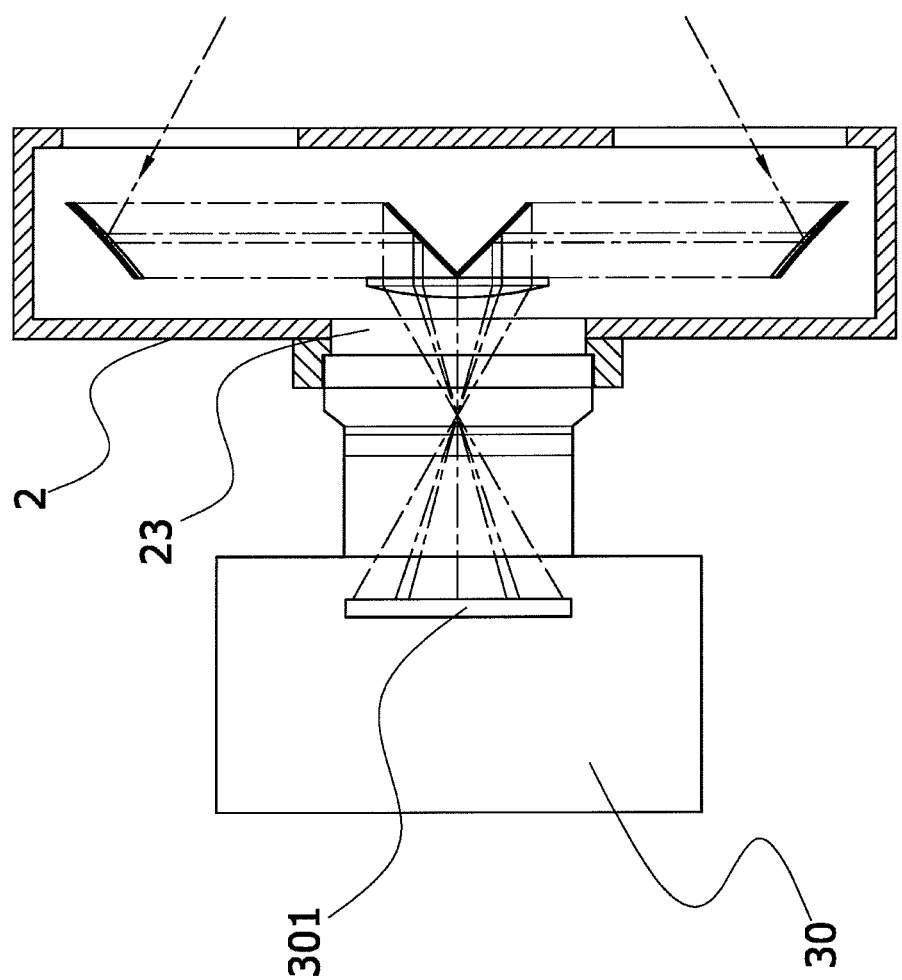
FIG. 4 is a schematic diagram (I) of implementation of the present invention.
Figure 5:
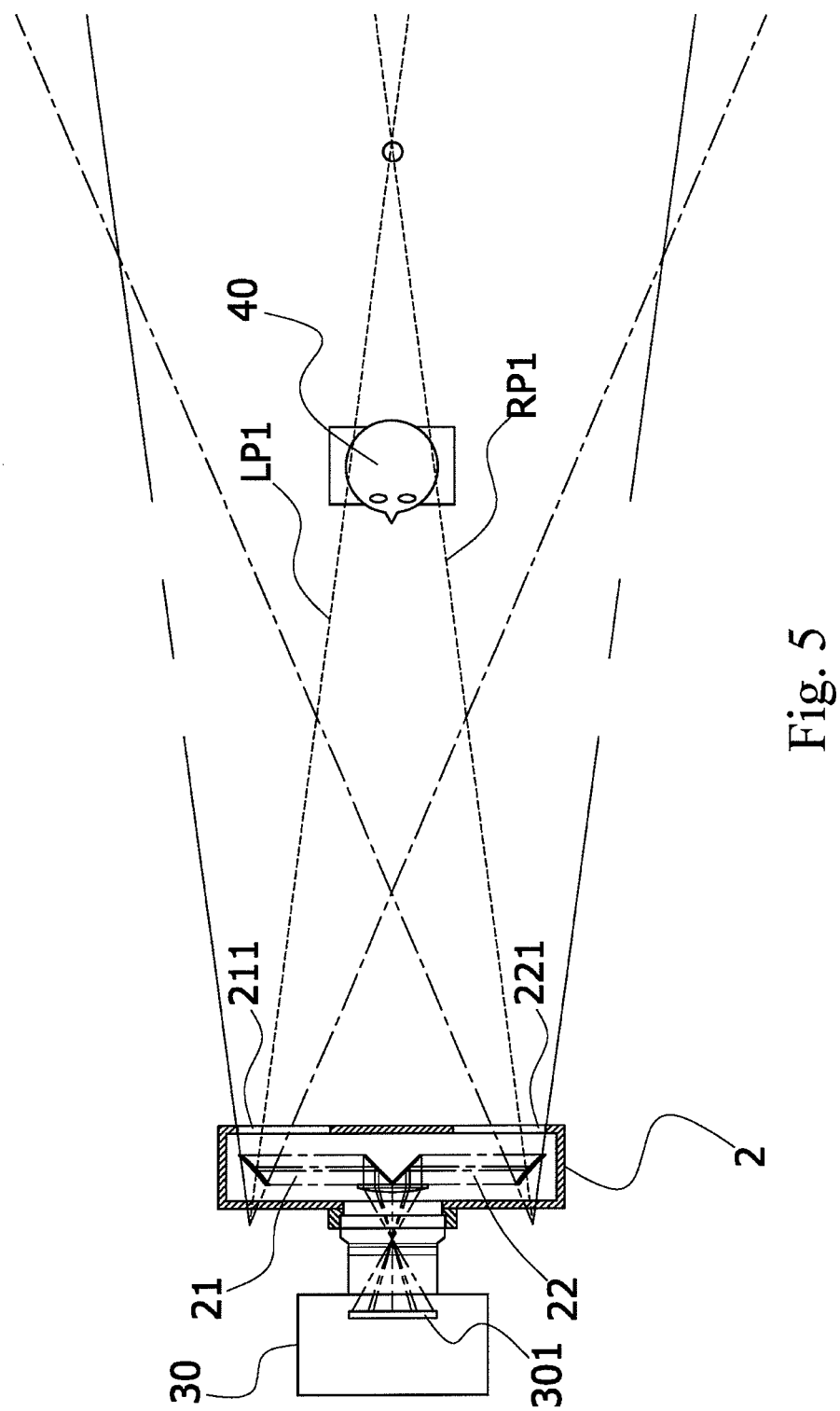
FIG. 5 is a schematic diagram (II) of implementation of the present invention.
Figure 6:
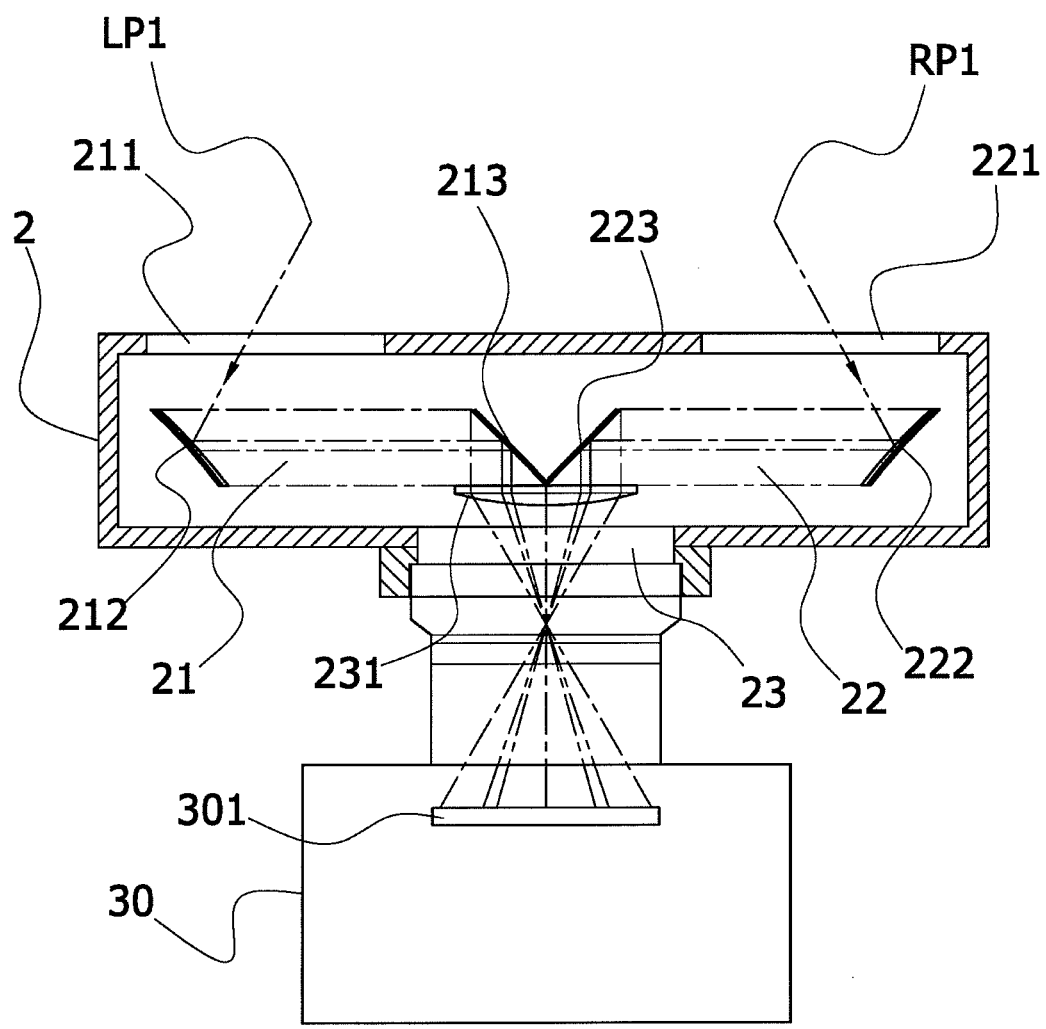
FIG. 6 is a schematic diagram of optical paths during implementation of the present invention.

FIG. 4 is a schematic diagram (I) of implementation of the present invention. As shown in FIG. 4, the TPCR with focal length and disparity control 2 may be installed in front of an imaging device 30. The imaging device may be a single-lens reflex camera or a video camera. After the installation, the central image inlet 23 corresponds to an imaging module 301 of the imaging device 30, for example, a charge-coupled device (CCD) or a complementary metal-oxide-semiconductor (CMOS). FIG. 5 is a schematic diagram (II) of implementation of the present invention. As shown in FIG. 5, a scene 40 to be shot is located in front of the TPCR with focal length and disparity control 2. When an operator shoots the scene (or performs an imaging operation), due to the influence of light rays, images of the shot scene 40 synchronously enter the TPCR with focal length and disparity control 2 through the left side imaging channel 21 and the right side imaging channel 22 respectively. The image entering through the left side image inlet 211 of the left side imaging channel 21 is a left side view image LP1. The image entering through the right side image inlet 221 of the right side imaging channel 22 is a right side view image RP1. FIG. 6 is a schematic diagram of optical paths during implementation of the present invention. As shown in FIG. 6, when the left side view image LP1 arrives at the left side outward reflecting unit 212, is reflected in parallel to the left side inward reflecting unit 213 by the left side outward reflecting unit 212, is reflected by the left side inward reflecting unit 213, passes through the convex lens 231 and is focused, and then enters the imaging device 30 through the central image inlet 23. Moreover, the right side view image RP1 arrives at the right side outward reflecting unit 222, is reflected in parallel to the right side inward reflecting unit 223; is reflected by the right side inward reflecting unit 223, passes through the convex lens 231 and is focused, and then enters the imaging device 30 through the central image inlet 23. Accordingly, the imaging module 301 of the imaging device 30 can synchronously obtain the left side view image LP1 and the right side view image RP1.

Figure 7:
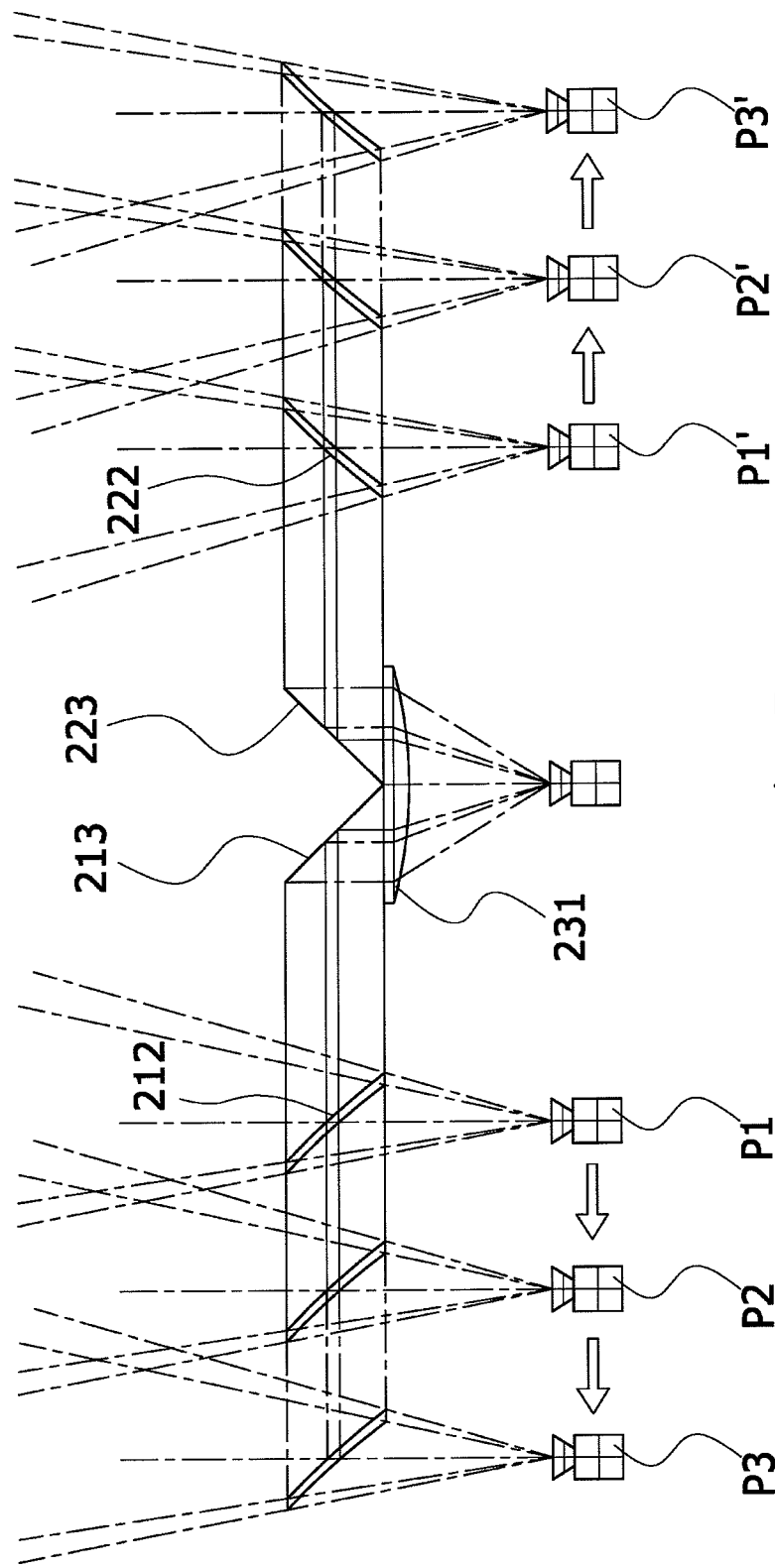
FIG. 7 shows another preferred embodiment (I) of the present invention.

FIG. 7 is another preferred embodiment (I) of the present invention. As shown in FIG. 7, the left side outward reflecting unit 212 and the right side outward reflecting unit 222 can be further designed to be a movable adjustment mechanism, so that the left side outward reflecting unit 212 can be adjusted for displacement of a relative distance with respect to the left side inward reflecting unit 213, and the right side outward reflecting unit 222 can also be adjusted at a relative distance with respect to the right side inward reflecting unit 223. In this way, when an image capturing operation is performed, a disparity adjustment function is achieved according to the present invention. As shown in FIG. 7, under control of an operator, positions of the left side outward reflecting unit 212 and the right side outward reflecting unit 222 may be changed. Displacement adjustment of position (P1 to P3 and P1' to P3') is shown in FIG. 7. The movable adjustment mechanism of the left side outward reflecting unit 212 and the right side outward reflecting unit 222 may be designed to have a function of synchronously adjusting displacement. The movable adjustment mechanism may be of a mechanical type, an electronic type or a combination thereof.

Figure 8:
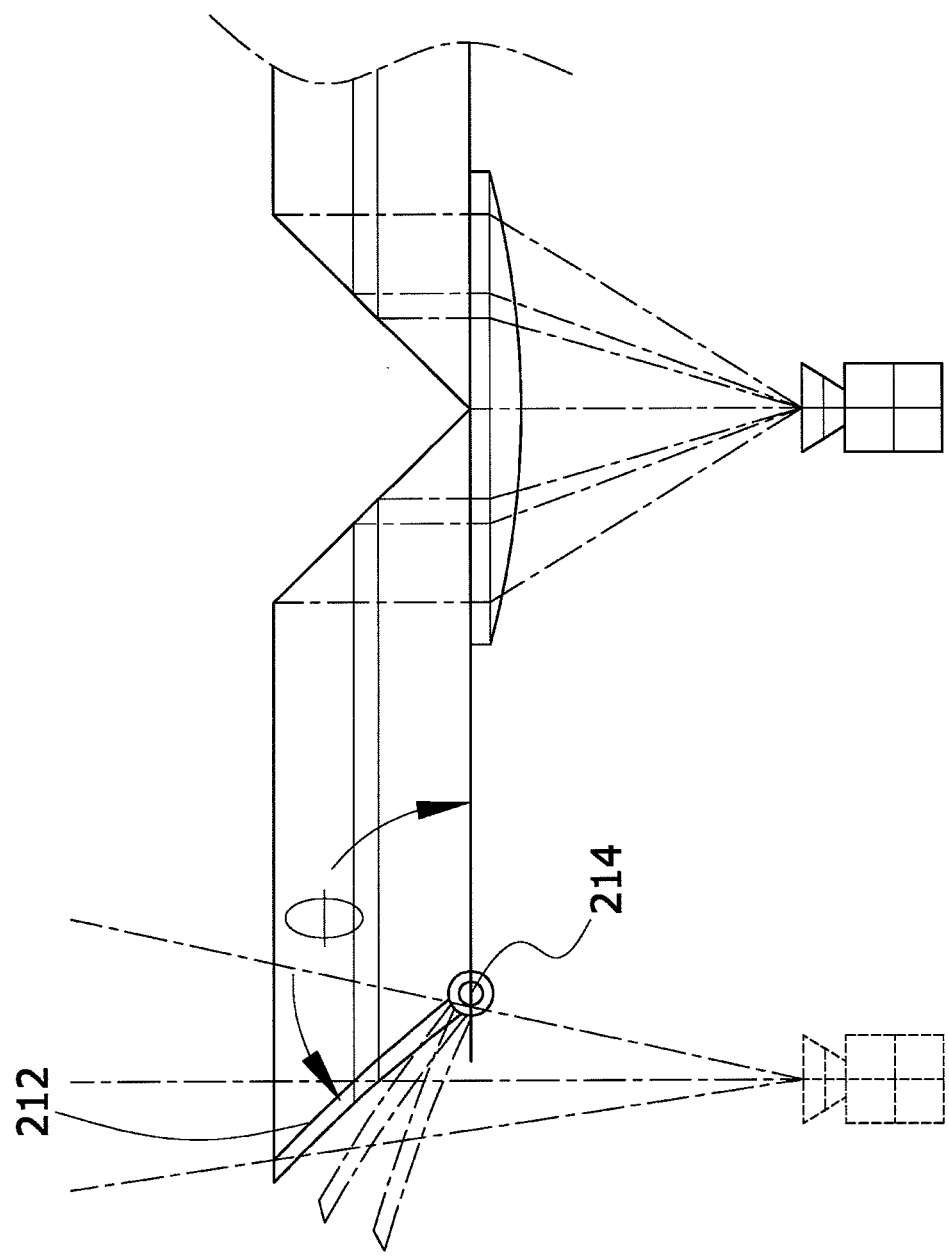
FIG. 8 shows another preferred embodiment (II) of the present invention.

FIG. 8 is another preferred embodiment (II) of the present invention. As shown in FIG. 8, the left side outward reflecting unit 212 (or the right side outward reflecting unit 222) of the present invention may be further designed to be an angle deflection adjustment mechanism, so as to enable an operator to adjust the focal length and the disparity during imaging. As shown in FIG. 8, the left side outward reflecting unit 212 may be assembled with a rotation shaft 214, which may be collocated with a second control device (not shown in FIG. 8), so as to enable the operator to operate the control device in the imaging process, so that the left side outward reflecting unit 212 can be deflecting around the rotation shaft 214 as a center to change an angle of the left side outward reflecting unit 212, thereby achieving the function of adjusting the focal length and disparity in imaging, where an angle Θ formed between the left side outward reflecting unit 212 and the central image inlet may be used as a reference. The structure of the right side outward reflecting unit 222 is the same as that of the left side outward reflecting unit 212. Deflection angles of the left side outward reflecting unit 212 and the right side outward reflecting unit 222 may be synchronous and with a quantified degree.

Figure 9:
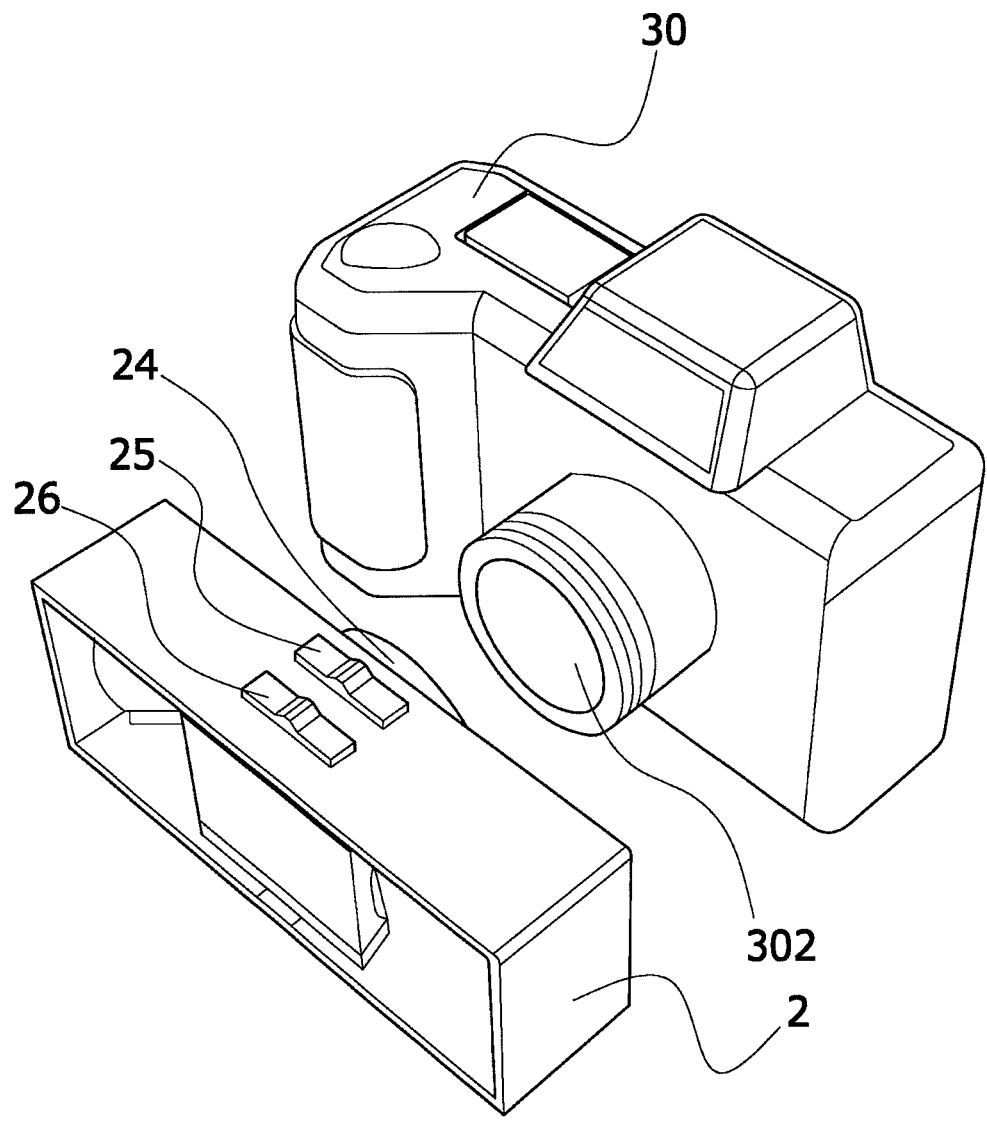
FIG. 9 is a three-dimensional outside view of a finished product of the present invention.

FIG. 9 is a three-dimensional outside view of a finished product of the present invention. As shown in FIG. 9, on the physical exterior of the TPCR with focal length and disparity control 2 of the present invention that is assembled on a lens 302 in the front of the imaging device 30, an assembly portion 24 may be shaped, so that the TPCR with focal length and disparity control 2 can be rapidly assembled on the lens 302. A first control device 25 may be further assembled, for actuating the movable adjustment mechanism (referring to FIG. 7). When being operated, the first control device 25 can actuate the left side outward reflecting unit 212 and the right side outward reflecting unit 222 to produce displacement, so that the operator can adjust disparity during imaging. A second control device 26 may be further assembled. When being operated, the second control device 26 can actuate the rotation shaft 214 to drive the left side outward reflecting unit 212 and the right side outward reflecting unit 222 to be deflected to change the angles (referring to FIG. 8), so that the operator can adjust the focal length during imaging. The second control device 26 may be a mechanical control device, an electronic control device or a combination for actuating the rotation shaft 214.

Figure 10:
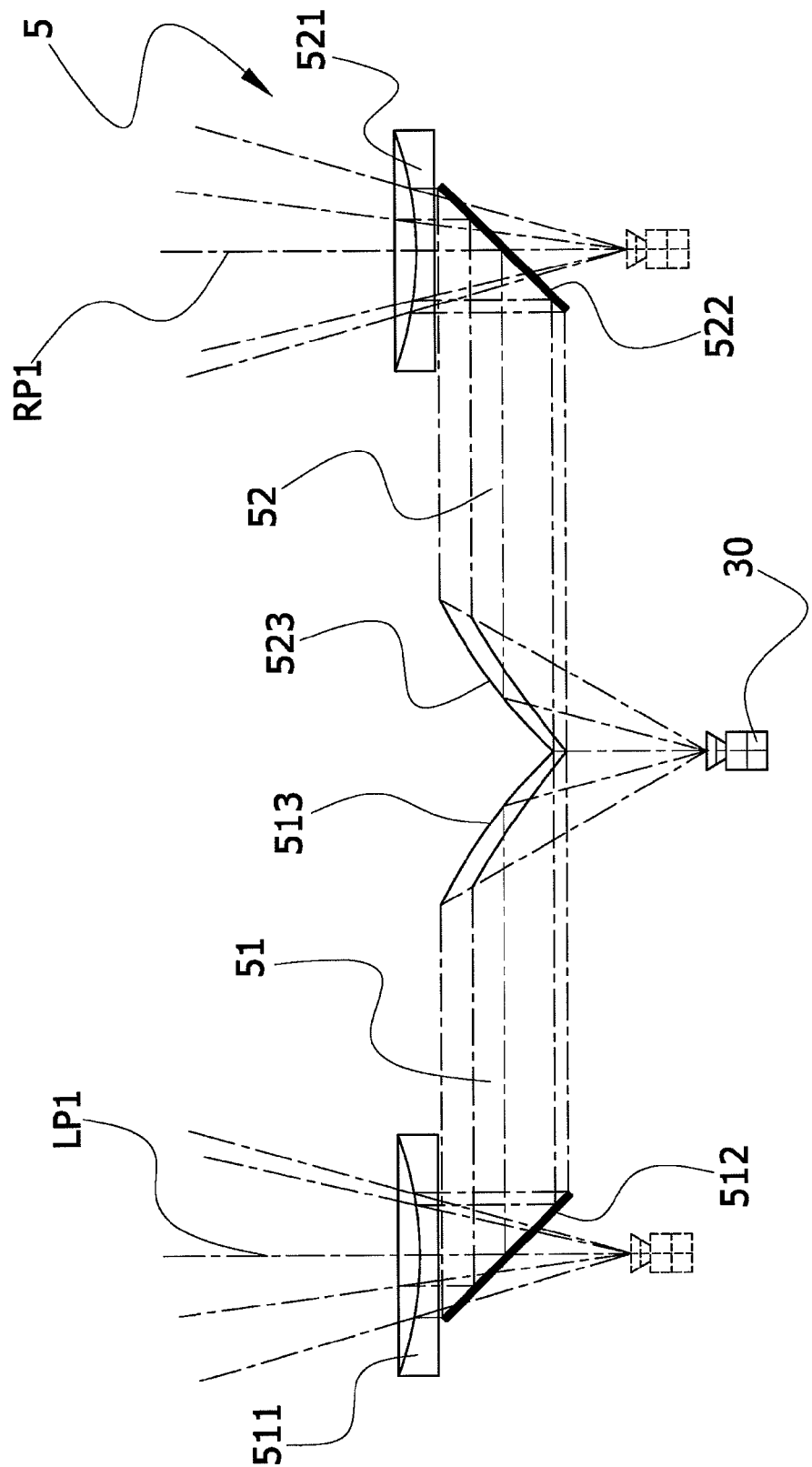
FIG. 10 shows another preferred embodiment (III) of the present invention.

FIG. 10 is another preferred embodiment (III) of the present invention. As shown in FIG. 10, in the TPCR with focal length and disparity control 5, the left side imaging channel 51 has a left side concave lens 511, a left side outward flat reflecting unit 512, and a left side inward curved reflecting unit 513; the right side imaging channel 52 has a right side concave lens 521, a right side outward flat reflecting unit 522, and a right side inward curved reflecting unit 523. As shown in FIG. 10, in the left side imaging channel 51, a left side view image LP1 of an imaged scene is collected by a concave surface of the left side concave lens 511 with a large curvature. After passing through the left side concave lens 511, the left side view image LP1 arrives at the left side outward reflecting unit 512 and is reflected in parallel to the left side inward reflecting unit 513, and is reflected out by the left side inward reflecting unit 513 (and enters an imaging device 30 through a central image inlet). The right side imaging channel 52 has the same function. As shown in FIG. 10, the left side concave lens 511 and the left side outward flat reflecting unit 512 in the left side imaging channel 51 may be designed to form a module capable of generating synchronous displacement actions. In this way, during imaging, the left side concave lens 511 and the left side outward flat reflecting unit 512 can be adjusted at a relative distance from the left side inward reflecting unit 513 under control, thereby achieving the function of adjusting the disparity during imaging.

Figure 11:
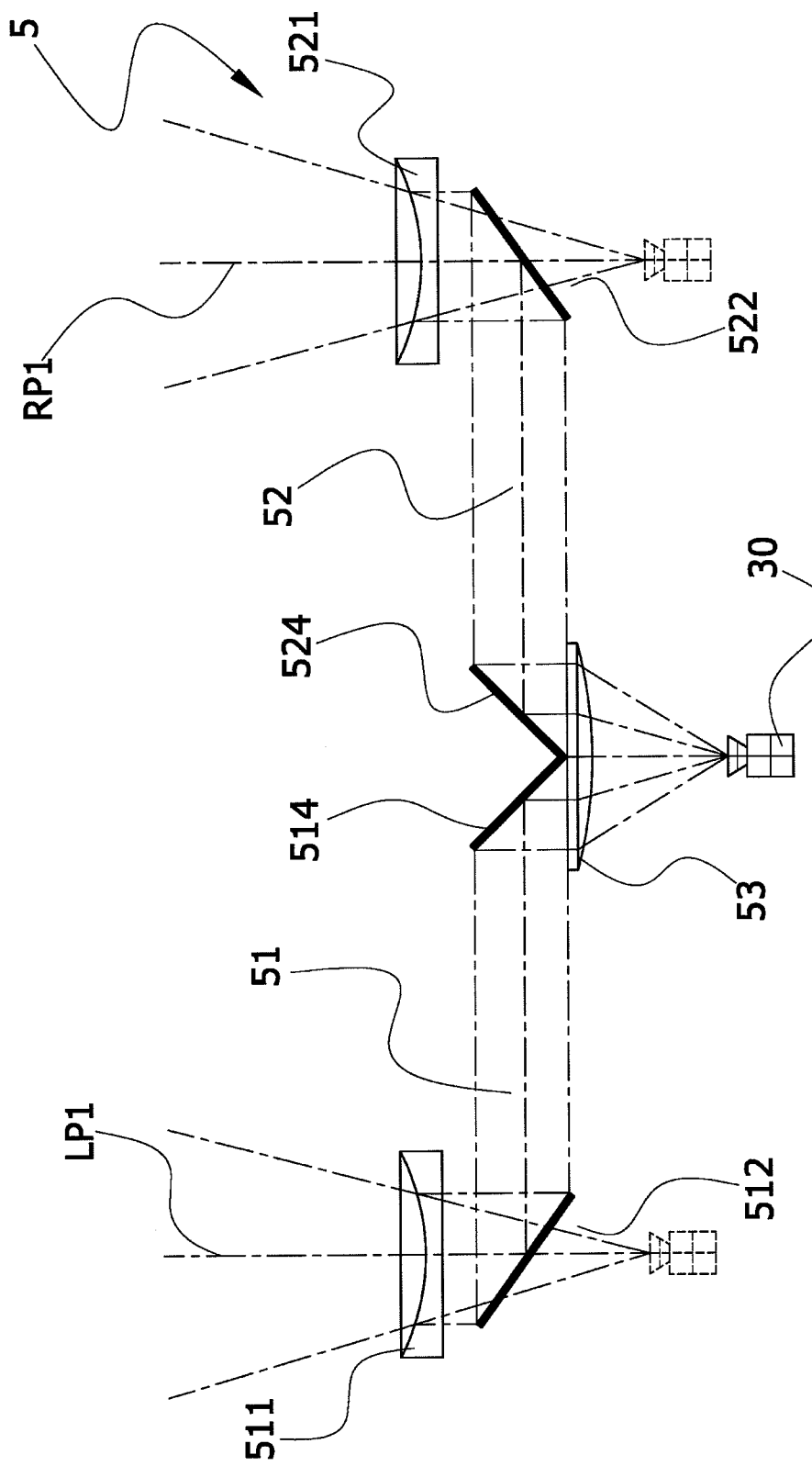
FIG. 11 shows another preferred embodiment (IV) of the present invention.

FIG. 11 is another preferred embodiment (IV) of the present invention. As shown in FIG. 11, another feasible embodiment is further proposed, where the original left side inward curved reflecting unit 513 in the left side imaging channel 51 of the preferred embodiment (III) is replaced with a flat mirror capable of generating reflection (that is, a left side reflecting mirror 514 shown in FIG. 11); the original right side inward curved reflecting unit 523 in the right side imaging channel 52 is replaced with a flat mirror capable of generating reflection (that is, a right side reflecting mirror 524 shown in FIG. 11); and a convex lens 53 is further assembled in an optical path reflection direction of the left side reflecting mirror 514 and the right side reflecting mirror 524. As shown in FIG. 11, in the left side imaging channel 51, a left side view image LP1 of an imaged scene is collected by a concave surface of the left side concave lens 511 with a large curvature. After passing through the left side concave lens 511, the left side view image LP1 arrives at the left side outward reflecting unit 512 to be reflected in parallel to the left side inward reflecting unit 513, is reflected out by the left side reflecting mirror 514, is focused by the convex lens 53, and enters an imaging device 30 through a central image inlet. The right side imaging channel 52 has the same function.

Based on the above, in the present invention, an outward reflecting module is formed by a curved reflecting mirror or a concave lens collocated with a flat reflecting mirror, so that light can enter the outward reflecting module from outside during imaging. In addition, an inward reflecting module is formed by a curved reflecting mirror or a flat reflecting mirror collocated with a convex lens. The outward reflecting module and the inward reflecting module construct a TPCR, which can synchronously capture a left-view image and a right-view image of a scene into an imaging device and control the disparity and the focal length in an image generation process by adjusting a view distance and direction. In the structure disclosed in the present invention, light rays can be transmitted in parallel in the two parallel channels, so that the view distance and direction can be adjusted. Accordingly, after being implemented, the present invention at least has the following two advantages.

(1) The light rays are reflected in parallel between the outward reflecting unit and the inward reflecting unit. Regardless of whether a greater or smaller disparity is required, in the present invention, it is only necessary to use an outward reflecting unit and an inward reflecting unit of the same size, so that under the same disparity range condition, the thickness of the finished product of the present invention is less than that of any conventional similar device, and it is estimated that the thickness may be reduced by about ⅔. With the specific miniaturized result, the present invention can be quickly assembled in front of, for example, the lens of the single-lens reflex camera or may be even embedded into, for example, the frame of a display of a computer, which facilitates the application of the present invention to image capturing and 3D imaging.

(2) The positions of the outward reflecting units can be shifted, and the angles of the outward reflecting units can also be adjusted, so that during the image generation process, the user can implement operations of controlling the disparity and the focal length by using the present invention.

In sum, after the present invention is implemented accordingly, the objective of providing a TPCR with focal length and disparity control that is capable of being miniaturized and controlling the disparity and the focal length can surely be achieved.

The above descriptions are merely preferred embodiments of the present invention, but are not intended to limit the implementation scope of the present invention. Any equivalent variations and modifications made by persons skilled in the art without departing from the script and scope of the present invention shall all fall within the patent scope of the present invention.

What is claimed is:

1. A two-parallel-channel reflector (TPCR) with focal length and disparity control, assembled on an imaging device, so that the imaging device is capable of synchronously capturing a left side view image and a right side view image of a scene, the TPCR comprising:

a left side imaging channel, constructed by a left side image inlet, a left side outward reflecting unit formed by a curved reflecting mirror, and a left side inward reflecting unit formed by a flat reflecting mirror, wherein an end of the left side imaging channel is connected to a central image inlet;

a right side imaging channel, constructed by a right side image inlet, a right side outward reflecting unit formed by a curved reflecting mirror, and a right side inward reflecting unit formed by a flat reflecting mirror, wherein an end of the right side imaging channel is connected to the central image inlet; and a convex lens, assembled in the central image inlet;

wherein the left side and the right side imaging channels are configured whereby the left side view image enters from the left side image inlet, arrives at the left side outward reflecting unit, is reflected in parallel to the left side inward reflecting unit, is reflected by the left side inward reflecting unit, passes through the convex lens, and enters the imaging device through the central image inlet, the right side view image enters from the right side image inlet, arrives at the right side outward reflecting unit, is reflected in parallel to the right side inward reflecting unit, is reflected by the right side inward reflecting unit, passes through the convex lens, and enters the imaging device through the central image inlet; and further wherein a parallel reflection path is defined for each of the left side view and right side view images reflected from the left side and right side outward reflecting units to the left side and right side inward reflecting units.

2. The TPCR with focal length and disparity control according to claim 1, wherein the imaging device has an imaging module.

3. The TPCR with focal length and disparity control according to claim 2, wherein the imaging module is a charge-coupled device (CCD).

4. The TPCR with focal length and disparity control according to claim 2, wherein the imaging module is a complementary metal-oxide-semiconductor (CMOS).

5. The TPCR with focal length and disparity control according to claim 1, wherein the left side outward reflecting unit has a movable adjustment mechanism, so that a distance between the left side outward reflecting unit and the left side inward reflecting unit is adjustable.

6. The TPCR with focal length and disparity control according to claim 5, wherein the movable adjustment mechanism is of a mechanical type, an electronic type, or a combination thereof.

7. The TPCR with focal length and disparity control according to claim 5, wherein the movable adjustment mechanism is actuated by a first control device.

8. The TPCR with focal length and disparity control according to claim 1, wherein the right side outward reflecting unit has a movable adjustment mechanism, so that a distance between the right side outward reflecting unit and the right side inward reflecting unit is adjustable.

9. The TPCR with focal length and disparity control according to claim 8, wherein the movable adjustment mechanism is of a mechanical type, an electronic type, or a combination thereof.

10. The TPCR with focal length and disparity control according to claim 8, wherein the movable adjustment mechanism is actuated by a first control device.

11. The TPCR with focal length and disparity control according to claim 1, wherein an angle is formed between the left side outward reflecting unit and the central image inlet, the left side outward reflecting unit is assembled with a rotation shaft, so that the left side outward reflecting unit is capable of deflecting around the rotation shaft as a center to change a degree of the angle.

12. The TPCR with focal length and disparity control according to claim 11, wherein the rotation shaft is actuated by a second control device.

13. The TPCR with focal length and disparity control according to claim 12, wherein the second control device is a mechanical control device, an electronic control device, or a combination thereof, for actuating the rotation shaft to rotate.

14. The TPCR with focal length and disparity control according to claim 1, wherein an angle is formed between the right side outward reflecting unit and the central image inlet, the right side outward reflecting unit is assembled with a rotation shaft so that the right side outward reflecting unit is capable of deflecting around the rotation shaft as a center to change a degree of the angle.

15. The TPCR with focal length and disparity control according to claim 14, wherein the rotation shaft is actuated by a second control device.

16. The TPCR with focal length and disparity control according to claim 15, wherein the second control device is a mechanical control device, an electronic control device, or a combination thereof for actuating the rotation shaft to rotate.

17. The TPCR with focal length and disparity control according to claim 1, wherein the right side outward reflecting unit formed by the curved reflecting mirror and the left side outward reflecting unit formed by the curved reflecting mirror are replaceable with flat reflecting mirrors respectively, and a concave lens is assembled in front of each of the left side and right side outward flat reflecting mirrors.

18. The TPCR with focal length and disparity control according to claim 17, wherein each of the flat reflecting mirrors has a movable adjustment mechanism, so that a distance between each of the flat reflecting mirrors and each of the inward reflecting units is adjustable.

19. The TPCR with focal length and disparity control according to claim 17, wherein the left side inward reflecting unit formed by the flat reflecting mirror and the right side inward reflecting unit formed by the flat reflecting mirror are replaceable with curved reflecting mirrors respectively.

20. The TPCR with focal length and disparity control according to claim 19, wherein each of the outward flat reflecting mirrors has a movable adjustment mechanism, so that a distance between each of the outward flat reflecting mirrors and each of the inward reflecting units is adjustable.

* * * * *